June 19, 1951  E. T. MARTIN  2,557,552
HEADBAND
Filed Oct. 11, 1948
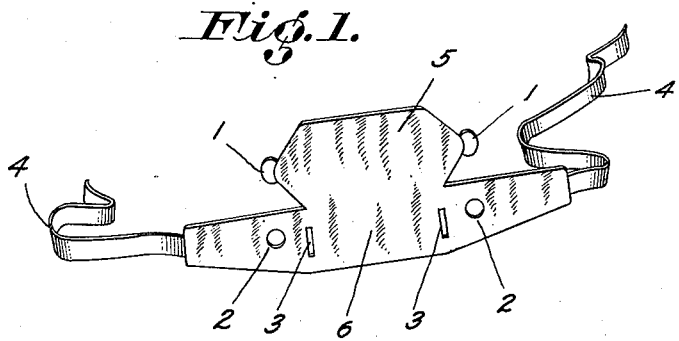
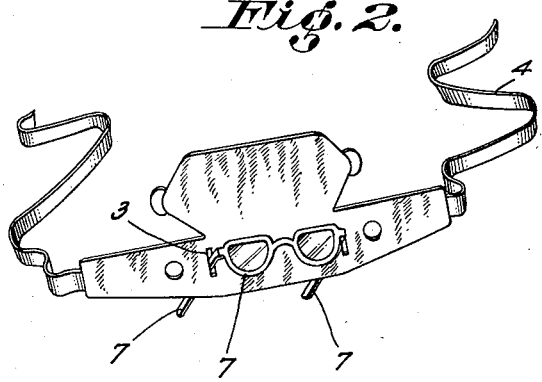
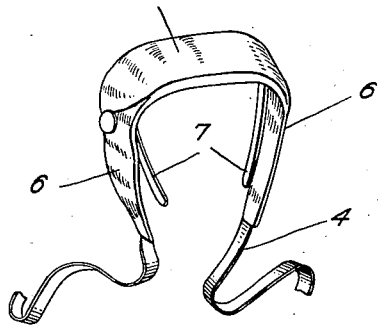
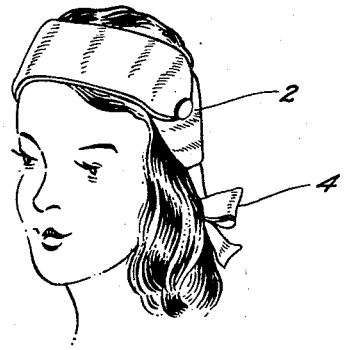
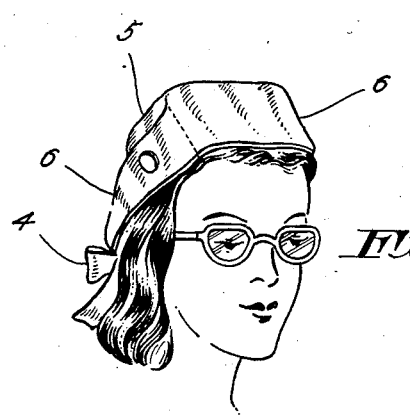
Inventor
Eileen T. Martin Patented June 19, 1951

2,557,552

UNITED STATES PATENT OFFICE 2,557,552

HEADBAND

Eileen T. Martin, New York, N. Y.

Application October 11, 1948, Serial No. 53,941

1 Claim. (Cl. 2—198)

My invention relates to headgear, and particularly to headbands which are adapted to hold, protect and conceal eyeglasses when not in use for vision, and which are adapted to be worn as caps when eyeglasses are in use for vision.

The object of the invention is to provide a device of this character which will be cheap to manufacture and easy of application, and which will have no parts other than the materials, ribbons and buttons of which the headband is constructed.

With this and other objects in view, the invention consists of certain novel features of construction, combination and arrangement of parts, as will be more fully described and particularly pointed out in the appended claim.

In the accompanying drawings: Figure 1 is a horizontal view of one form of the device without the eyeglasses; Fig. 2 is a similar view of the invention with the eyeglasses inside the device; Fig. 3 is a vertical view of another form of the invention. It shows the closed headband with eyeglasses contained therein; Fig. 4 is a similar view, showing the device as it looks when worn on the head with the eyeglasses enclosed; Fig. 5 is a vertical view of another form of the invention. It shows the headband worn as a cap on the head when the eyeglasses are in use for vision.

Referring more especially to the drawings, 1 represents the loops, 2 the buttons, 3 the slits which receive the side pieces or temple bars of the eyeglasses. These temple bars go through the slits 3 and extend downward along the sides of the head just in back of the ears, 4 is the ribbon attached to each side of the band, 5 is the oblong extension piece which is part of the headband, 6 is the headband proper; the eyeglass frame rests on the center of this portion between the two slits 3.

In the form shown in Figure 1 the piece forming the headband 5 and 6 comprises a single piece of material, preferably a quilted material, fur cloth or the like, or any suitable material which has sufficient softness and thickness to protect the eyeglasses, and which may serve as a cap.

In Figure 2 I have represented a headband of the same general outline as that shown in Fig. 1, but have inserted the temple bars of the eyeglasses 7 through the slits 3.

In Figure 3 I have represented a headband in a vertical position with the eyeglasses concealed by means of folding the oblong extension piece 5 over the lens portion of the eyeglasses 7 and fastening loops 1 onto buttons 2 at sides of band 6.

In Figure 4 I have represented a headband of the same general outline as that shown in Fig. 3, but with the headband shown as worn on the head, with eyeglasses enclosed and with ribbons 4 tied low in back of the head.

In Figure 5 I have represented a headband of the same general outline as that shown in Figs. 3 and 4, but have provided that the eyeglasses 7 have been removed from band 6 and are in use, and that the oblong extension piece 5 be turned back on the head and the sides of it tucked in back and under sides of band 6. In this position the headband may be used as a cap.

From the foregoing description, taken in connection with the accompanying drawing, the construction and operation of the invention will be understood without requiring a further explanation.

Various changes in the form, proportion and the minor details of construction may be resorted to without departing from the principle or sacrificing any of the advantages of this invention.

Having thus described my invention, what I claim and desire to secure by Letters Patent is:

A headband, providing a protective receptacle for eyeglasses, comprising a piece of soft material having a somewhat longitudinally extending rectangular main portion and an oblong upper portion having loops at its ends, and extending centrally from one side of the main portion, said main portion having tying ribbons extending from the ends, a pair of buttons on said main portion at points equidistant from the ends, the distance between said buttons corresponding to the length of the upper portion, said buttons adapted to receive said loops at the end of said upper portion, said main portion provided with slits at points spaced apart and inwardly from said buttons, said slits adapted to receive temple bars of eyeglasses, said oblong upper portion extending in length about twice the width of the main portion of the band, said upper portion when folded over the main body portion adapted to protect eyeglasses which have had their temple bars inserted through said slits and which rest on said main portion, said tying ribbons at end of main portion providing means for securing the headband to the head of the wearer.

EILEEN T. MARTIN.

REFERENCES CITED

The following references are of record in the file of this patent:

UNITED STATES PATENTS

| Number | Name | Date |
|---|---|---|
| 947,636 | Degges | Jan. 25, 1910 |
| 1,182,210 | Rosenbaum | May 9, 1916 |
| 1,749,340 | Grean | Mar. 4, 1930 |
| 2,116,076 | Lipton | May 3, 1938 |
| 2,431,568 | Kovitz | Nov. 25, 1947 |

FOREIGN PATENTS

| Number | Country | Date |
|---|---|---|
| 11,159 | Great Britain | May 10, 1912 |